United States Patent

Parker et al.

[11] Patent Number: 5,078,496
[45] Date of Patent: Jan. 7, 1992

[54] MACHINE VISION SURFACE CHARACTERIZATION SYSTEM

[75] Inventors: Jeffrey B. Parker, Calumet; Brian J. Czubko, Ann Arbor, both of Mich.

[73] Assignee: Autospect, Inc., Ann Arbor, Mich.

[21] Appl. No.: 567,271

[22] Filed: Aug. 14, 1990

[51] Int. Cl.⁵ .............................................. G01B 11/24
[52] U.S. Cl. ...................................... 356/371; 356/446
[58] Field of Search ...................... 356/124.5, 371, 446

[56] References Cited

U.S. PATENT DOCUMENTS

| | | | |
|---|---|---|---|
| H.220 | 2/1987 | Vogel | 356/124.5 |
| 3,509,349 | 4/1970 | Molines et al. | 356/446 |
| 4,629,319 | 12/1986 | Clarke et al. | 356/237 |
| 4,717,259 | 1/1988 | Suga | 356/446 |
| 4,792,232 | 12/1988 | Jobe et al. | 356/394 |
| 4,847,510 | 7/1989 | Douglas | 356/371 |

FOREIGN PATENT DOCUMENTS

| | | | |
|---|---|---|---|
| 71289 | 6/1977 | Japan | 356/446 |
| 100310 | 5/1988 | Japan | 356/371 |

*Primary Examiner*—Richard A. Rosenberger
*Attorney, Agent, or Firm*—Krass & Young

[57] ABSTRACT

This invention is a surface inspection system including a light source having a sharp edge between dark and bright and a video camera imaging this edge reflected from the surface. The light intensity of the light source is controlled using a light intensity sensor. An optical system focusses an image of the light source at the video camera with sufficient depth of focus to include the surface to be inspected. The exposure duration is set to prevent blurring if the surface to be inspected is moving. A surface quality computation apparatus computes at least one measure of surface quality, such as gloss, distinctness of reflected image and orange peel of the surface, from the video image signal. This surface quality computation apparatus preferably includes a frame grabber and a general purpose digital computer. Gloss is computed by determination of the maximum and minimum brightness slopes of the video image signal of the edge. Distinctness of reflected image is similarly computed and then corrected for the difference between the maximum brightness and minimum brightness of the video image signal. Orange peel is computed by determination of the periodicity variations of the positions of maximum and minimum brightness slope in the video image signal of the edge.

18 Claims, 2 Drawing Sheets

MACHINE VISION SURFACE CHARACTERIZATION SYSTEM

TECHNICAL FIELD OF THE INVENTION

The technical field of the present invention is automatic surface inspection. This invention provides an automatic characterization of several surface quality measures of a glossy or semi-glossy surfaces, such as painted surfaces, plastics, polished wood, etc., employing machine vision technology.

BACKGROUND OF THE INVENTION

There are many instances where it is desirable to maintain a consistent painted surface quality. This may be the case for an object assembled from several painted parts or for a manufactured object having a large painted surface. In particular it may be desirable to control gloss (shininess), distinctness of reflected image (sharpness) and orange peel (roughness) of the painted surface. Control of these surface qualities requires measurement. It would also be desirable to automate these measurements. In a typical manufacturing operation painted parts move on an assembly line. Thus it would also be desirable to make these surface quality measurements on moving objects.

Prior instruments for making surface quality measurements have problems. A first type of prior instrument required a subjective determination by a trained observer. This type of instrument does not provide a repeatable measure when used by different operators. Automatic optical instruments exist in the prior art for making such surface quality measurements. Some of these instruments make measurements of very small areas of the surface. Other such instruments include rotating mirrors. Such devices are often unsuitable for the typical manufacturing environment where dust may enter delicate mechanisms. Thus it would be desirable to provide an automated surface quality measurement apparatus which measures an extended surface area and does not employ moving parts.

SUMMARY OF THE INVENTION

This invention is a surface inspection system. This surface inspection system includes a light source having a sharp edge between dark and bright directed to the surface to be inspected at a predetermined angle. A video camera forms a video image signal of this edge reflected from the surface. The scan lines of the video camera are preferably perpendicular to the sharp edge. A surface quality computation apparatus computes at least one measure of surface quality from the video image signal. This surface quality computation apparatus preferably includes a frame grabber and a general purpose digital computer.

The light intensity of the light source is controlled. A light intensity sensor detects the light intensity of the light source. A shroud tube ensures that substantially all the light reaching the light intensity sensor comes from the light source. A light intensity controller employs this intensity signal for controlling the light source to maintain substantially constant light intensity.

The present invention includes an optical system disposed between the surface to be inspected and the video camera. The optical system provides a focussed image of the light source at the video camera. The optical system provides a depth of focus including the surface to be inspected. The optical system preferably includes an electronic exposure control opened at regular intervals for a predetermined period of time. The exposure may be controlled by a mechanical shutter, by an electronic shutter such as a liquid crystal device or by a light sensor, such as a charge coupled device, whose sensitivity is controllable. A pulsed light source may be used to control the effective exposure duration. The effective exposure duration is determined to prevent blurring greater than the spatial resolution of the video camera if the surface to be inspected is moving.

The light source preferably consists of a fluorescent aperture lamp. An alternating current drives this fluorescent aperture lamp. This alternating current has an oscillation period not greater than one tenth of the exposure duration. This ensures that each exposure includes plural light pulses.

One embodiment has the light source, the light intensity sensor, the light intensity controller and the video camera enclosed in a handheld enclosure. A reflector disposed within the enclosure folds the light path permitting a more compact instrument. This reflector is preferably a first surface mirror.

The surface quality computation apparatus preferably computes the gloss, distinctness of reflected image and orange peel of the surface. Gloss is computed by determination of the maximum and minimum brightness slopes of the video image signal of the edge of the light band. Distinctness of reflected image is similarly computed and then corrected for the difference between the maximum brightness and minimum brightness of the video image signal. Orange peel is computed by determination of the periodicity variations of the positions of maximum and minimum brightness slope in the video image signal of the edge.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

This invention enables inspection of glossy and semi-glossy surfaces for surface roughness at multiple spatial frequencies. This invention uses computer analysis of a reflected structured light source. The computer calculates gloss, distinctness of reflected image and orange peel.

Gloss is the ratio of specular reflection to diffuse reflection from the surface. A purely diffuse surface has no gloss while a fully specular surface has maximum gloss. Surface roughness at spatial wavelengths about and below the wavelength of incident light causes diffuse reflection and thus low gloss. Surface absorption of incident light also lowers gloss as the total reflected light is reduced. Surface roughness below the resolution of the imaging optics will add to the apparent diffuse component of the reflection and thus also lower gloss.

Distinctness of reflected image is the brightness corrected sharpness of the transition from dark to light of the image of the light source edge. Distinctness of reflected image is one measure of the quality of the reflected image of the surface. The physical processes leading to low distinctness of reflected image are the same as those for gloss exclusive of absorption losses. Distinctness of reflected image differs from gloss in that absorption reduces gloss but does not affect distinctness of reflected image. A highly absorbing surface would necessarily have a low gloss but may have a distinct, though dark, image.

Orange peel is one term among many describing surface roughness visible to the unaided eye as deviations from local planarity. It can encompass many spatial frequencies above the threshold of visible roughness. This designation recalls the visibly rough surface of an orange.

Figure 1:
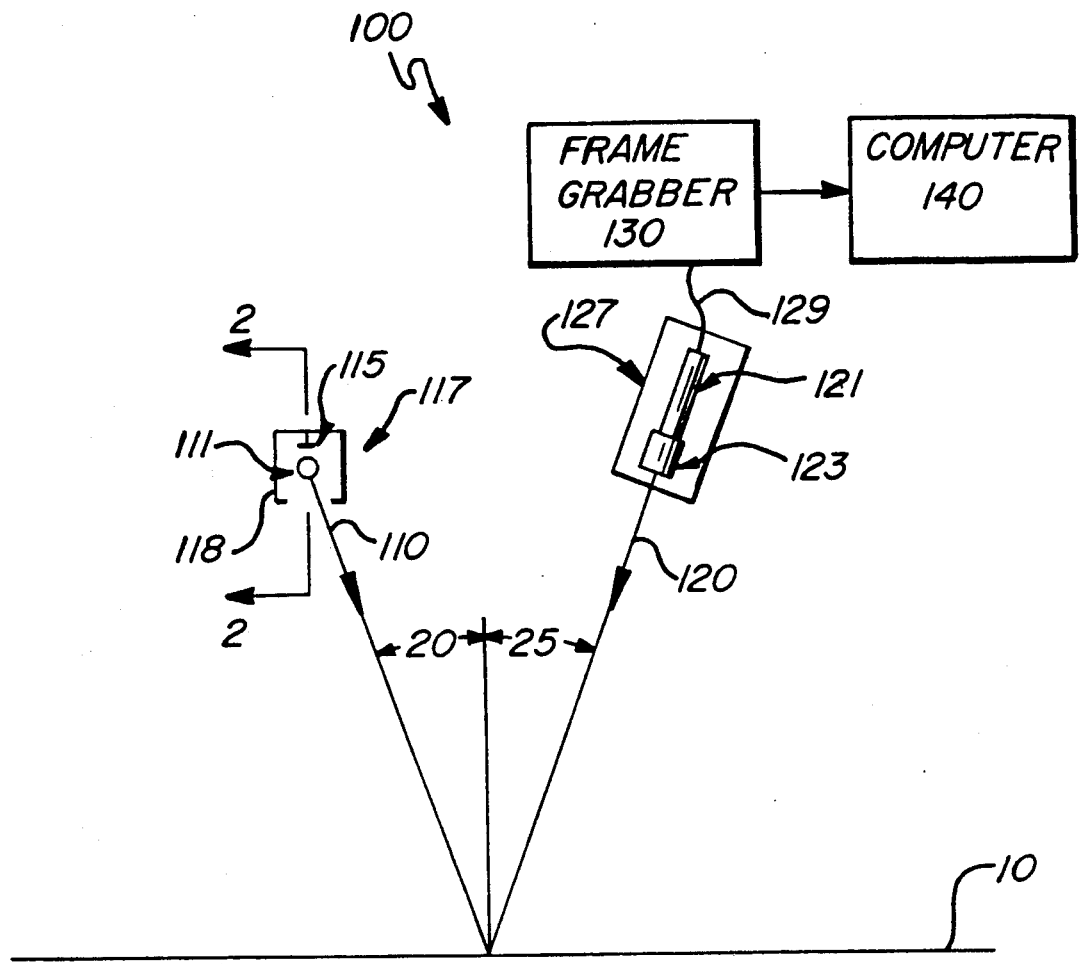
FIG. 1 illustrates a sectional view of the lamp and video camera sensor of this invention in relation to the surface to be sensed.

FIG. 1 illustrates the preferred embodiment of the machine vision surface characterization system. Lamp 111 provides at least one edge having a sharp transition from dark to bright. Lamp 111 is placed at a predetermined distance and at the predetermined angle 20 from the surface 10 to be inspected. The preferred inspection angle for glossy surfaces in industry standards is 20 degrees from the surface normal. For semi-gloss surfaces angles encompassing the 60 and 85 degree range are preferred.

Figure 2:
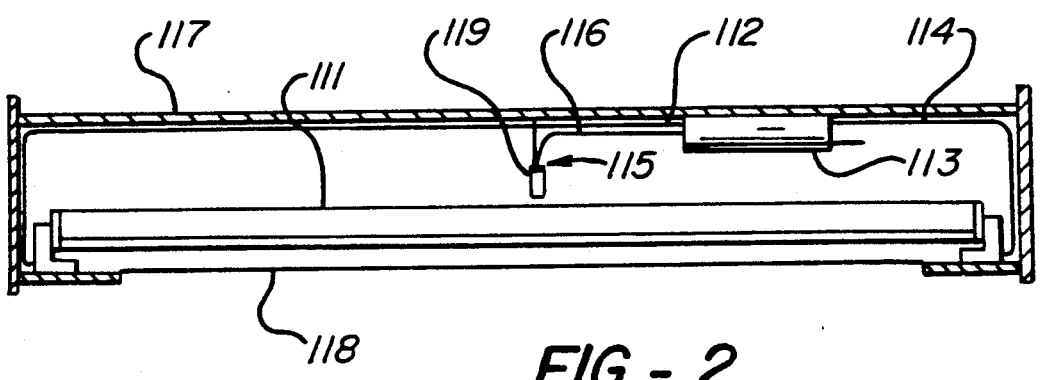
FIG. 2 illustrates a sectional view of the lamp assembly illustrated in FIG. 1.

Housing 117 encloses lamp 111, together with lamp controller 113 (see FIG. 2) and photoresistor 115. Housing 117 has an opening 118 permitting light beam 110 to illuminate the surface 10. Lamp 111 is preferably linear. A linear light source greatly simplifies the analysis requirements. A fluorescent aperture tube is preferred. Fluorescent aperture tubes are readily available and can provide the light intensity and the sharp edge between dark and bright necessary. FIG. 2 illustrates a sectional view of housing 117 along the lines 2—2 of FIG. 1. FIG. 2 illustrates lamp 111 as a fluorescent aperture tube.

Lamp 111 should be held at a constant brightness to maintain stable measurements. Lamp controller 113 provides light intensity control of lamp 111. Lamp controller 113 supplies illumination power to lamp 111 via lines 112 and 114. Photoresistor 115 detects the brightness of lamp 111. Shroud tube 119 ensures that photoresistor 115 receives no extraneous light. Lamp controller 113 receives the output of photoresistor 115. Lamp controller 113 employs this measure of light intensity in closed loop control of the drive of lamp 111. Lamp controller 113 preferably supplies lamp 111 at a frequency much higher than the 60 Hz power line frequency for reasons set forth below. The embodiment illustrated in FIGS. 1 and 2 preferably employs a lamp controller commercially available from Mercron.

This invention employs an electro-optic sensor capable of resolving spatial detail located at the image plane. The electro-optic sensor employs an array sensor, a line scan sensor scanned in one dimension or a point sensor scanned in two dimensions to convert the image into electronic form. FIG. 1 illustrates video camera 121 which images the specular reflection of lamp 111 from the surface 10 to be inspected. This specular reflection is at angle 25 to the surface 10. Angle 25 is equal to angle 20 and in the opposite direction to the illumination. Video camera 121 is preferably at a similar distance from the surface 10 as lamp 111. The angle of illumination 20 and the angle of inspection 25 are dictated by the expected range of surface gloss as noted above. These angles are adjusted to provide a specular reflection of sufficient contrast for detection. Housing 127 encloses video camera 121 and imaging optics 123. A frame (not illustrated in FIG. 1) preferably holds housings 117 and 127 in a fixed relationship. This fixed relationship sets the angles 20 and 25, and the respective distances from surface 10 to lamp 111 and video camera 121. This embodiment illustrated in FIG. 1 preferably employs a commercial RS-170 video camera array sensor.

Video camera 121 is preferably aligned to sample the image plane perpendicular to the source edges. That is, the scan lines of video camera 121 are perpendicular to the reflection of the sharp transition from dark to bright of the edge. This yields maximum edge brightness slope and thus the surest edge detection. This orientation of video camera 121 is especially useful under low distinctness of reflected image (weak edge) conditions.

There is a complex relationship between the sensitivity of video camera 121, the parameters of the optical system 123, the inspection distance and the intensity required of lamp 111. The inspection distance is dictated by the edge location deviation amplitude sensitivity required for orange peel measurement and the camera and optical system resolution capacity. For a given camera resolution, size of inspection area and optical resolution, the edge location deviation sensitivity increases with increased inspection distance. The linear deviation at the image plane of an incident ray traced from the source edge to a point on the surface having a constant angular deviation from local planarity and to the image plane increases with increased inspection distance. Thus orange peel amplitude sensitivity increases for increased inspection distance. The desired orange peel amplitude sensitivity must be compromised with the need for greater light intensity or increased camera sensitivity at greater inspection distances. The inspection distance is also limited by the space constraints of a particular installation. The preferred embodiment illustrated in FIG. 1 employs an inspection distance of roughly 1 meter from lamp 111 to surface 10 and from surface 10 to video camera 121.

The length of the inspection area must be roughly 10 times the maximum orange peel wavelength to be measured. This length ensures sufficient sampling at that orange peel wavelength and controls the orange peel measurement variability. FIG. 1 illustrates the inspection surface halfway between lamp 111 and video camera 121. Thus the length of lamp 111 must be approximately twice this length of the inspection area.

Optical system 123 sets the focus, the depth of focus, the aperture and the duration of the exposure. In order to image moving surfaces, such as moving parts on an assembly line, the exposure duration must be set inversely proportional to the speed. The exposure duration must place any motion blur below the resolution of video camera 121. An exposure duration of 1/1000th of a second is adequate for speeds such as those of fenders on an automobile assembly line. The AC frequency used to drive lamp 111 thus must be greater than about 40 KHz. This ensures that each exposure includes several flashes of lamp 111 regardless of the drive frequency phase when the exposure begins. In the alternative, lamp 111 may be a DC fluorescent lamp having a constant brightness. This would also ensure proper exposure regardless of when the exposure begins.

There are several techniques for control of the exposure duration. A mechanical shutter such as used for still cameras may be used. An electro-optic shutter formed of liquid crystal elements can be used. In the preferred embodiment, the electro-optic sensor is a charge coupled device video camera. In this case the exposure duration is controlled electronically by control of the length of time the video camera is sensitive to light.

Optical system 123 preferably provides optimum focus at the distance to lamp 111. In addition optical system 123 preferably provides a depth of focus sufficient to image both lamp 111 and surface 10 simultaneously. Considering these requirements, optical system 123 of the embodiment illustrated in FIG. 1 preferably provides an aperture of F16 to F22.

The optical requirements dictate the required intensity of lamp 111. The inspection distance is set by the desired orange peel sensitivity. The maximum orange peel wavelength to be measured sets the length of the inspection area. The speed of motion of surface 10 determines the exposure duration. The effective aperture is determined by the desired depth of focus. With these parameters set, the sensitivity of video camera 121 determines the minimum intensity of lamp 111 for proper operation.

Video camera 121 supplies the video image signal to frame grabber 130 via cable 129. Frame grabber 130 is a computer memory. Frame grabber 130 digitizes the received analog gray scale video signal. This digitized representation of the video signal image is stored in frame grabber 130. As the name implies, frame grabber 130 has as a minimum sufficient memory to store one raster scan frame from video camera. This frame is periodically updated from the video signal received from video camera 121.

In some cases frame grabber 130 preferably includes more than one frame of memory. It is sometimes desirable to take two measures of a single surface in rapid succession and then compute the surface qualitites from each image. This permits greater accuracy in the measurements. In this case frame grabber 130 must include sufficient memory to store two raster scan frames. Frame grabber 130 stores these two frames until needed in the computation by computer 140.

Computer 140 analyses the frame data stored in frame grabber 130. Computer 140 is preferably of the same capacity as an IBM AT compatible computer. If computer 140 is embodied as an IBM AT compatible computer, then frame grabber 130 can be embodied as a plug-in auxiliary circuit board. Computer 140 employs the digitized video data in computation of the gloss, distinctness of reflected image and orange peel of the surface 10. The image is entirely sampled and stored before analysis begins. This eliminates the need for the inspected surface to be stationary for the time required for analysis. In the embodiment illustrated in FIG. 1, the computations require roughly 1¼ seconds.

If computer 140 has sufficient computation capacity, then frame grabber 130 need not include any memory. It is feasible for computer 140 to perform the surface quality computations without the need for storage of the entire image. This would require computational capacity beyond that currently available in desk top personal computers.

Figure 3:
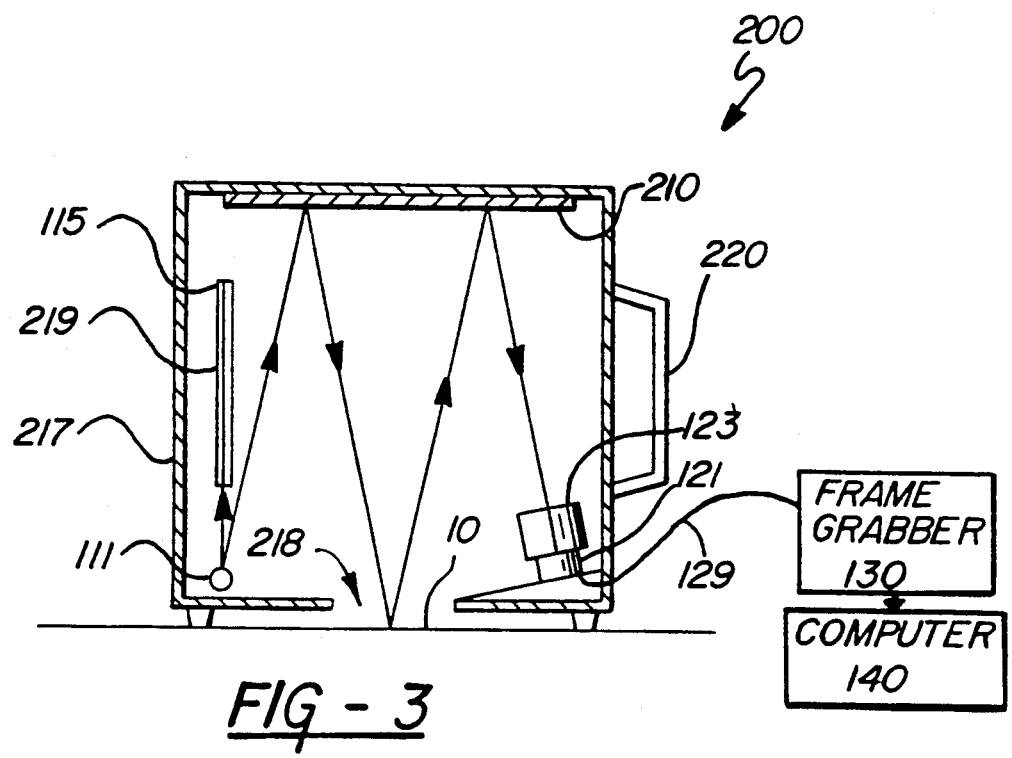
FIG. 3 illustrates a sectional view of the lamp and video camera sensor of an alternative embodiment of this invention.

FIG. 3 illustrates a sectional view of an alternative embodiment of the present invention. In this alternative embodiment, housing 217 encloses all the optical components. Lamp 111 is disposed in the bottom of housing 217 with its light directed upwards to mirror 210. Mirror 210 reflects this light through opening 218 to surface 10. Mirror 210 further reflects this light to optical system 123 and video camera 121. Mirror 210 is preferably a first surface mirror to minimize optical distortions. Mirror 210 serves to fold the optical path permitting a more compact instrument. In addition, the alternative embodiment of FIGS. 3 and 4 preferably employs an inspection distance of roughly 0.50 meters from lamp 111 via mirror 210 to surface 10 and from surface 10 via mirror 210 to video camera 121. Shroud tube 219 ensures that photoresistor 115 receives light from lamp 111 alone. Housing 217 is of generally handheld dimensions and includes carrying handle 220. This construction permits housing 217 to be hand carried to the surface to be measured. Mirror 210 permits greater compactness by folding the light path of the measurement. Video camera 121 supplies the video image signal to frame grabber 130 and computer 140 in the manner previously described.

Figure 4:
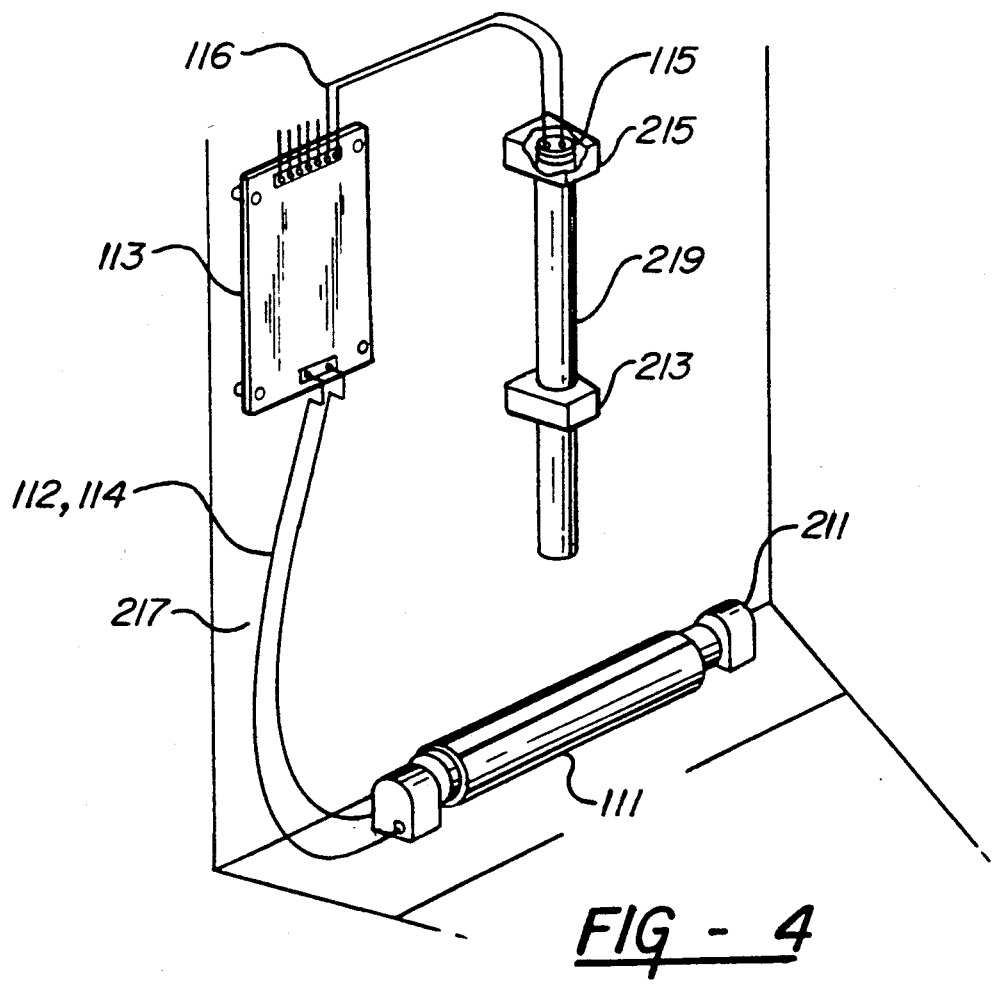
FIG. 4 illustrates a perspective partially cut away view of the lamp assembly illustrated in FIG. 3.

FIG. 4 is a cut away perspective view of the lighting assembly of this alternative embodiment. Lamp 111 is mounted via mounts 211. Shroud tube 219 is mounted via mounts 213 and 215. Lamp controller 113 is coupled to photoresistor 115 via lines 116 and to lamp 111 via lines 112 and 114. This alternative embodiment is preferably powered by 12 volts DC supplied by computer 140. Computer 140 preferably supplies this electric power via cable 129.

Computer 140 operates on the image in frame grabber 130 to compute gloss, distinctness of reflected image and orange peel. Gloss is computed as the maximum brightness slope of the image of the source edge. Distinctness of reflected image is computed as the maximum brightness slope of the image of the source edge divided by the difference between maximum and minimum brightness on the image. Orange peels are measured as the deviation from local linearity of image structure when an object of sufficient contrast is viewed specularly reflected from the surface of interest.

The analysis of the reflected edge image begins by review of the gray scale values of the individual picture elements or pixels in the digital image. It is desirable from the standpoint of measurement accuracy to employ every line of the video image produced by video camera 121. The amount of computation can be reduced at the sacrifice of accuracy by employing only every Nth line. The preferred embodiment employs every fourth line. Each such line from the top to the bottom of the image is considered from left to right. The maximum and minimum brightness slopes, the locations of these maximum and minimum brightness slopes and the brightness maximum and minimums are noted. The slope is computed by the difference between the brightness of current pixel minus the brightness of the prior pixel. Note that the brightness slope of a light to dark edge is negative. The embodiments of the invention illustrated in FIGS. 1 and 3 will ordinarily include two edges. The first edge is the transition from dark to light upon reaching the illuminated section. The second edge is the transition from light to dark upon leaving the illuminated section. The analysis of this invention preferably employs the brightness slope of both edges.

The analysis is aborted if no edge is detected. The absolute values of the maximum and minimum brightness slopes are compared to an edge detection threshold. The analysis continues only if a sufficient number of values exceed the edge detection threshold. This ensures that the analysis is operating on a well defined edge.

If edge detection is confirmed, then the maximum and minimum brightness slope points are further analyzed. A region before and after the maximum brightness slope location and the minimum brightness slope location for each line is considered. This permits the computation of a more precise measure of the maximum or minimum slope locations using a slope weighted mean of the position of each pixel and several adjacent pixels.

During this analysis computer 140 computes respective running sums of the maximum brightness slope, the minimum brightness slope, the maximum brightness and the minimum brightness. If absolute values of the maximum brightness slope and the minimum brightness slope for the current line exceeds the edge detection threshold, then those values for the current line are added to the respective running sums. If not, then the prior values are added to the respective running sums and a count of sequential failed edge detection is incremented. This process continues for each line in turn until either the bottom of the image is reached or the number of sequential failed edge detections exceeds a sequential failed edge detection threshold. The analysis then tests to determine if the difference between the number of attempted lines minus the number of failed edge detections exceeds a successful edge detection threshold. If this is the case, then analysis continues. If not, then analysis is aborted.

Gloss can now be computed. The maximum brightness slope average and the minimum brightness slope average are computed employing the respective running sums. The gloss is set as the average of the absolute values of the maximum brightness slope average and the minimum brightness slope average. Note that a sharp reflected edge results in calculation of a high absolute value maximum brightness slope and minimum brightness slope. Conversely, a diffuse edge results in calculation of a low absolute value maximum brightness slope and minimum brightness slope.

The distinctness of reflected image can now be calculated. The calculation includes the previously computed gloss. The maximum brightness average and the minimum brightness average are computed employing the respective running sums. Distinctness of reflected image is computed as the ratio of the gloss divided by the difference between the maximum brightness average and the minimum brightness average. This corresponds substantially to the gloss as corrected for reflected brightness.

Orange peel is computed by analysis of the graininess of the detected edge. This graininess is detected in several orange peel bands based upon the maximum brightness slope locations and the minimum brightness slope locations in each line of the image. This process begins by smoothing the determined edges of the entire image. Each maximum brightness slope location is replaced by the mean of the maximum brightness slope location of the current line and the two preceding and following lines. This removes high frequency noise such as produced by video camera 121.

Orange peel is computed for several bandwidths denoted by a band number. The same computation is made for each band number. This computation employs the maximum slope location and the minimum slope location for each line meeting the edge detection criteria. The computation is essentially the same for both the maximum slope location and the minimum slope location. Only the maximum slope location computation will be described in detail, it being understood that a similar computation is made for the minimum slope location.

A mean maximum slope location difference is computed. The computation starts with the first line having a detected edge and runs to the last line having a detected edge. The analysis computes a first running sum of the absolute difference between the maximum slope location of the current line and the mean maximum slope location of a band around the current maximum slope location. This band includes a number of lines proportional to product of the orange peel bandwidth and the current orange peel band number under consideration. Next, the maximum slope location of the current line is replaced with the mean maximum slope location of the band around the current maximum slope location. If the current absolute difference is more than three times the average absolute difference computed from the first running average, then the current absolute difference is added to a second running sum and a count of excessive absolute difference lines is incremented. The mean maximum slope location difference is computed once all the lines have been considered. This mean maximum slope location difference equals the ratio of a first difference to a second difference. The first difference is the first running sum minus the second running sum. This is the difference of the total absolute difference less the excessive absolute difference. The second difference is the total number of lines considered less the count of excessive absolute difference lines. The mean maximum slope location difference is a measure of the edge roughness corrected for the effects of excessive absolute difference lines caused by occasional localized surface defects far from the edges, such as dirt.

The orange peel for the particular band number is computed from the mean maximum slope location difference and mean minimum slope location difference. Recall that the analysis makes a similar computation from the minimum brightness slope locations. This computation is the mean minimum slope location difference. The orange peel for the band number under consideration is the logarithm of the average of the mean maximum slope location difference and mean minimum slope location difference. The process repeats for all desired orange peel bands.

After this image analysis the measures are corrected to a calibrated standard. The apparatus of this invention measures the surface qualities of reference surfaces having known gloss, distinctness of reflected image and orange peels. This measurement includes the described apparatus and algorithm. The standard values for each surface quality of the reference surfaces are linearly correlated with the measured surface qualities using this invention. Future measurements use linear regression coefficients to map to the reference scale.

Those skilled in the art would recognize that a number of modifications and alternatives of the described embodiments are possible. The computer can compute statistical measures of central tendency of the respective surface quality measurements.

A multiple edged light source can be used to provide a larger sampling of the inspection surface and thus reduced variability in results over displacements on the order of the imaged area. This can be achieved using multiple source lamps or multiple images. Multiple source lamps can be used in applications requiring analysis of larger areas of the surface to reduce spatial variability in the results. In such a case, the analysis algorithm is applied to each pair of dark/light and light/dark edges. The results from each pair of edges is then averaged to give a measure of the surface quality over a larger portion of the image. Multiple time separated images at a given location provides greater sampling of digitizer and electro-optic noise and thus reduced variability in results over time. For applications where motion induced blur is below the sensor resolution, two images can be acquired and digitized for analysis at each surface location. The results are averaged, thus reducing time based electro-optic and digitizing noise. As noted above, in this case the frame grabber includes enough memory to store both images. For each image, the analysis algorithm is applied successively to each pair of source edges.

We claim:

1. A surface inspection system comprising:
   a light source forming a light beam including at least one edge having a sharp transition from dark to bright, said light beam directed to a predetermined portion of the surface to be inspected at a predetermine angle;
   an electro-optic sensor having a field of view directed at said predetermined angle to said predetermined portion of the surface to be inspected for forming a two dimensional video image signal of said edge of said light beam, said two dimensional video image having a plurality of pixels forming plural lines of scan disposed perpendicular to said at least one edge of said light beam; and
   a surface quality computation apparatus coupled to said electro-optic sensor and receiving said video image signal for computing the gloss of the surface to be inspected from said video image signal, said surface quality computation apparatus operative to
      compute the brightness slope of each pixel as the difference of the brightness of the current pixel and the brightness of the prior pixel in the current line of scan,
      determine for each edge for each line of scan the maximum absolute value brightness slope,
      compute the gloss of the surface from the average of the maximum absolute value brightness slope of the plural lines of scan for each edge.

2. The surface inspection system as claimed in claim 1, wherein:
   said electro-optic sensor includes a video camera.

3. The surface inspection system as claimed in claim 1, wherein:
   said light source forms said light beam including a first edge having a sharp transition from dark to bright and a second edge having a sharp transition from bright to dark;
   said surface quality computation apparatus being further operative to
      determine for each line of scan the maximum brightness slope and the minimum brightness slope,
      compute the average maximum brightness slope of the plurality lines of scan,
      compute the average minimum brightness slope of the plural lines of scan, and
      compute the gloss of the surface as the average of the absolute value of the average maximum brightness slope of the plural lines of scan and the absolute value of the average minimum brightness slope of the plural lines of scan.

4. The surface inspection system as claimed in claim 1, wherein:
   said electro-optic sensor includes a line scan sensor scanned in one dimension.

5. The surface inspection system as claimed in claim 1, wherein:
   said electro-optic sensor includes a point sensor scanned in two dimensions.

6. The surface inspection system as claimed in claim 1, wherein:
   said surface quality computation apparatus is further operative to
      abort computing the gloss of the surface to be inspected if the absolute value of said maximum brightness slope and the absolute values of said minimum brightness slope for a predetermined number of said lines of scan fail to exceed a predetermined edge detection threshold.

7. A surface inspection system comprising:
   a light source forming a light beam including at least one edge having a sharp transition from dark to bright, said light beam directed to a predetermined portion of the surface to be inspected at a predetermined angle;
   an electro-optic sensor having a field of view directed at said predetermine angle to said predetermined portion of the surface to be inspected for forming a two dimensional video image signal of said edge of said light beam, said two dimensional video image having a plurality of pixels forming plural lines of scan disposed perpendicular to said at least one edge of said light beam; and
   a surface quality computation apparatus coupled to said electro-optic sensor and receiving said video image signal for computing the distinctness of reflected image of the surface to be inspected from said video image signal, said surface quality computation apparatus operative to
      compute the brightness slope of each pixel as the difference of the brightness of the current pixel and the brightness of the prior pixel in the current line of scan,
      determine for each edge for each line of scan the maximum absolute value brightness slope,
      compute the average maximum absolute brightness slope of the plural lines of scan for each edge,
      determine for each line of scan the maximum brightness and the minimum brightness,
      compute the average maximum brightness of the plural lines of scan and the average minimum brightness of the plural lines of scan, and
      compute the distinctness of reflective image of the surface as the ratio of the average of the average maximum brightness slope of the plural lines of scan for each edge divided by the difference between the average maximum brightness of the plural lines of scan and the average minimum brightness of the plural lines of scan.

8. The surface inspection system as claimed in claim 7, wherein:
   said light source forms said light beam including a first edge having a sharp transition from dark to bright and a second edge having a sharp transition from bright to dark;
   said surface quality computation apparatus is further operative to determine for each line of scan the maximum brightness slope and the minimum brightness slope, compute the average maximum brightness slope of the plural lines of scan, compute the average minimum brightness slope of the plural lines of scan, and compute the distinctness of reflective image of the surface as the ratio of the average of the absolute value of the average maximum brightness slope of the plural lines of scan and the absolute value of the average minimum brightness slope of the plural lines of scan divided by the difference between the average maximum brightness of the plural lines of scan and the average minimum brightness of the plural lines of scan.

9. The surface inspection system as claimed in claim 7, wherein:

said electro-optic sensor includes a video camera.

10. The surface inspection system as claimed in claim 7, wherein:

said electro-optic sensor includes a line scan sensor scanned in one dimension.

11. The surface inspection system as claimed in claim 7, wherein:

said electro-optic sensor includes a point sensor scanned in two dimensions.

12. The surface inspection system as claimed in claim 7, wherein:

said surface quality computation apparatus is further operative to abort computing the distinctness of reflected image of the surface to be inspected if the absolute value of said maximum brightness slope and the absolute values of said minimum brightness slope for a predetermined number of said lines of scan fail to exceed a predetermined edge detection threshold.

13. A surface inspection system comprising:

a light source forming a light beam including at least one edge having a sharp transition from dark to bright, said light beam directed to a predetermined portion of the surface to be inspected at a predetermined angle;

an electro-optic sensor having a field of view directed at said predetermined angle to said predetermined portion of the surface to be inspected for forming a two dimensional video image signal of said edge of said light beam, said two dimensional video image having a plurality of pixels forming plural lines of scan disposed perpendicular to said at least one edge of said light beam; and a surface quality computation apparatus coupled to said electro-optic sensor and receiving said video image signal for computing the orange peel of the surface to be inspected for a particular selected bandwidth from said video image signal, said surface quality computation apparatus operative to compute the brightness slope of each pixel as the difference of the brightness of the current pixel and the brightness of the prior pixel in the current line of scan, determine for each edge for each line of scan the location of the maximum absolute value brightness slope, for each edge for each line of scan replacing the location of the maximum absolute value brightness slope with the average location of the maximum absolute value brightness slope of the current line of scan, the two prior lines of scan and the two following lines of scan, for each edge for each line of scan computing a mean maximum absolute value slope location for a band of scan lines around the current scan line, the band of scan lines including a number of lines proportional to the selected bandwidth, computing a first absolute difference between the maximum absolute value slope location of the current scan line and said mean maximum absolute value slope location for said band of scan lines, adding said first absolute difference to a first running sum, computing a mean first absolute difference from said first running sum and the number of prior scan lines, if said first absolute difference for the current line is greater than three times said mean first absolute difference then: 1) adding said first absolute difference to a second running sum; and 2) incrementing a first count of excessive absolute difference scan lines, computing a mean maximum slope location difference from the ratio of the difference between said first running sum and said second running sum divided by the difference between the total number of scan lines and the first count of excessive absolute difference scan lines, computing the orange peel for the particular selected bandwidth as the logarithm of the average of the means maximum absolute value slope location difference for each edge.

14. The surface inspection system as claimed in claim 13, wherein:

said light source forms said light beam including a first edge having a sharp transition from dark to bright and a second edge having a sharp transition from bright to dark;

said surface quality computation apparatus is further operative to determine for each line of scan the maximum brightness slope and the minimum brightness slope, for each line of scan replacing the location of the maximum brightness slope with the average location of the maximum brightness slope of the current line of scan, the two prior lines of scan and the two following lines of scan, for each edge for each line of scan computing a mean maximum slope location for a band of scan lines around the current scan line, the band of scan lines including a number of lines proportional to the selected bandwidth, computing a first absolutely difference between the maximum slope location of the current scan line and said mean maximum slope location for said band of scan lines, adding said first absolute difference to a first running sum, computing a means first absolute difference from said first running stand the number of prior scan lines, if said first absolute difference for the current line is greater than three times said means first absolute difference then: 1) adding said first absolute difference to a second running sum; and 2) incrementing a first count of excessive absolute difference scan lines, computing a mean maximum slope location difference from the ratio of the difference between said first running sum and said second running sum divided by the difference between the total number of scan lines and the first count of excessive absolute difference scan lines, for each line of scan replacing the location of the minimum brightness slope with the average location of the minimum brightness slope of the current line of scan, the two prior lines of scan and the two following lines of scan, for each line of scan computing a mean minimum slope location for a band of scan lines around the current scan line, the band of scan lines including a number of lines proportional to the selected bandwidth, computing a second absolute difference between the minimum slope location of the current scan line and said mean minimum slope location for said band of scan lines, adding said second absolute difference to a third running sum, computing a mean second absolute difference from said third running sum and the number of prior scan lines, if said second absolute difference for the current line is greater than three times said mean second absolute difference then: 1) adding said second absolute difference to a four running sum; and 2) incrementing a second count of excessive absolute difference scan lines, computing a mean minimum slope location difference from the ratio of the difference between said third running sum and said fourth running sum divided by the difference between the total number of scan lines and the second count of excessive absolute difference scan lines, and computing the orange peel for the particular selected bandwidth as the logarithm of the average of the mean maximum slope location difference and the mean minimum slope location.

15. The surface inspection system as claimed in claim 13, wherein:
said electro-optic sensor includes a video camera.

16. The surface inspection system as claimed in claim 13, wherein:
said electro-optic sensor includes a line scan sensor scanned in one dimension.

17. The surface inspection system as claimed in claim 13, wherein:
said electro-optic sensor includes a point sensor scanned in two dimensions.

18. The surface inspection system as claimed in claim 13, wherein:
said surface quality computation apparatus is further operative to
abort computing the orange peel of the surface to be inspected for said selected bandwidth if the absolute value of said maximum brightness slope and the absolute values of said minimum brightness slope for a predetermined number of said lines of scan fail to exceed a predetermined edge detection threshold.

* * * * *

UNITED STATES PATENT AND TRADEMARK OFFICE
CERTIFICATE OF CORRECTION

PATENT NO. : 5,078,496

DATED : January 7, 1992

INVENTOR(S) : Parker et al

It is certified that error appears in the above-identified patent and that said Letters Patent is hereby corrected as shown below:

Column 5, line 31, change "video signal image" to --video image--;

Column 9, line 64, change "plurality" to --plural--;

Column 12, line 57, change "absolutely" to --absolute--;

Column 12, line 63, change "means" to --mean--;

Column 12, line 64, change "running stand the" to --running sum and the--;

Column 13, line 35, change "four" to --fourth--.

Signed and Sealed this

Twenty-second Day of June, 1993

Attest:

MICHAEL K. KIRK

*Attesting Officer*   *Acting Commissioner of Patents and Trademarks*